(12) United States Patent
Seo et al.

(10) Patent No.: US 11,200,575 B2
(45) Date of Patent: Dec. 14, 2021

(54) DRIVE-THRU BASED ORDER PROCESSING METHOD AND APPARATUS

(71) Applicant: LG ELECTRONICS INC., Seoul (KR)

(72) Inventors: Young Yeon Seo, Seoul (KR); Young Ho Sohn, Seoul (KR); Chang Jun Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 16/590,025

(22) Filed: Oct. 1, 2019

(65) Prior Publication Data
US 2020/0034848 A1  Jan. 30, 2020

(30) Foreign Application Priority Data
Aug. 27, 2019  (KR) .......................... 10-2019-0105061

(51) Int. Cl.
*G06Q 20/40* (2012.01)
*G06Q 20/20* (2012.01)
(Continued)

(52) U.S. Cl.
CPC ... *G06Q 20/40145* (2013.01); *G06K 9/00288* (2013.01); *G06Q 20/20* (2013.01);
(Continued)

(58) Field of Classification Search
CPC ............. G06Q 20/40145; G06Q 20/20; G06Q 30/0641; G06Q 30/0631; G06Q 20/14;
(Continued)

(56) References Cited

U.S. PATENT DOCUMENTS 6,374,240 B1 *  4/2002  Walker .................. G06Q 20/20
                                                    705/15
9,008,370 B2 *  4/2015  Burry ................. G06Q 30/0202
                                                    382/105
(Continued)

FOREIGN PATENT DOCUMENTS

JP    2016173653 A  *  9/2016
KR  10-2006-0003894 A   1/2006
KR  10-2016-0036487 A   4/2016

OTHER PUBLICATIONS

Tanyeri, D. (2018). The Future of Automation in Foodservice: FE&S. Foodservice Equipment & Supplies, 71(5), 84-86,88-90,92-95. Retrieved from https://www.proquest.com/trade-journals/future-automation-foodservice/docview/2110262712/se-2?accountid=14753 (Year: 2018).*

(Continued)

*Primary Examiner* — Ashford S Hayles
(74) *Attorney, Agent, or Firm* — Birch, Stewart, Kolasch & Birch, LLP

(57) ABSTRACT

A drive-through order processing method and apparatus are disclosed. The drive-through order processing method includes receiving customer information detected through vision recognition, providing product information based on the customer information, and processing a product order of a customer. According to the present disclosure, it is possible to rapidly process an order using customer information based on customer recognition using an artificial intelligence (AI) model of machine learning through a 5G network.

18 Claims, 12 Drawing Sheets

(51) Int. Cl.
*G06Q 30/06* (2012.01)
*G06K 9/00* (2006.01)
*G06N 20/00* (2019.01)

(52) U.S. Cl.
CPC ..... *G06Q 30/0631* (2013.01); *G06Q 30/0641* (2013.01); *G06N 20/00* (2019.01)

(58) Field of Classification Search
CPC .. G06Q 20/18; G06Q 20/206; G06K 9/00288; G06K 9/00624; G06K 9/6274; G06K 2209/15; G06K 9/00228; G06K 9/00281; G06N 20/00; G06N 3/08; G07F 17/40
See application file for complete search history.

(56) References Cited

U.S. PATENT DOCUMENTS

| | | | | |
|---|---|---|---|---|
| 10,373,226 B1* | 8/2019 | Russell | | G06Q 30/0613 |
| 10,402,920 B2* | 9/2019 | Fox | | G06Q 20/3224 |
| 2007/0073586 A1* | 3/2007 | Dev | | G06Q 30/0601 |
| | | | | 705/14.25 |
| 2011/0071912 A1* | 3/2011 | McNamara | | G06Q 10/06 |
| | | | | 705/15 |
| 2012/0072311 A1* | 3/2012 | Khan | | G06Q 30/0635 |
| | | | | 705/26.81 |
| 2012/0246007 A1* | 9/2012 | Williams | | G06Q 30/02 |
| | | | | 705/14.66 |
| 2014/0136348 A1* | 5/2014 | Carroll | | G06Q 50/12 |
| | | | | 705/15 |
| 2017/0083856 A1* | 3/2017 | Song | | G06Q 10/0832 |
| 2017/0323505 A1* | 11/2017 | Gaddam | | H04L 63/08 |
| 2019/0108566 A1* | 4/2019 | Coleman | | G06Q 30/0633 |
| 2019/0279181 A1* | 9/2019 | Kelly | | G06Q 20/202 |
| 2020/0065881 A1* | 2/2020 | Truong | | G06Q 30/0633 |
| 2020/0202462 A1* | 6/2020 | Muyskens | | G06Q 50/12 |

OTHER PUBLICATIONS

Levin, A. (2019). The Restaurant of the Future: FE&S. Foodservice Equipment & Supplies, 72(1), 36-38,40,42,44. Retrieved from https://www.proquest.com/trade-journals/restaurant- (Year: 2019).*

* cited by examiner

DRIVE-THRU BASED ORDER PROCESSING METHOD AND APPARATUS

CROSS-REFERENCE TO RELATED APPLICATION

This present application claims benefit of priority to Korean Patent Application No. 10-2019-0105061, entitled "DRIVE-THRU BASED ORDER PROCESSING METHOD AND APPARATUS," filed on Aug. 27, 2019, in the Korean Intellectual Property Office, the entire disclosure of which is incorporated herein by reference.

BACKGROUND

1. Technical Field

The present disclosure relates to a drive-through order processing apparatus and method, and more specifically, to a method of processing a customer order based on drive-through, and an apparatus for performing a digital signage function using the method.

2. Description of Related Art

Drive-through is a business service that allows a customer to buy a product without parking.

A customer using drive-through can order a product and pay for the product while riding in a vehicle. In order to provide a drive-through service, a process of order processing, payment, and delivery of a product is required, and at least two employees need to be assigned to the drive-through service. Thus, there is a need to automate a drive-through system.

As one related art, a wireless electronic drive-through system and method are disclosed in Korean Patent Application Publication No. 10-2006-0003894 (published Jan. 11, 2006). According to this related art, a drive-through based customer order is processed through communication between a merchant system and an in-vehicle telematics control unit. However, although capable of improving the communication quality between an employee and a user, this technology can only be applied to a vehicle equipped with a telematics control unit.

In addition, as another related art, a drive-through based ordering method and apparatus are disclosed in Korean Patent Application Publication No. 10-2016-0036487 (published Apr. 4, 2016). According to this related art, an order area and a receiving area are separated, and a figure of an employee, placed only in the receiving area, is displayed in the order area through an image. However, in this technology, it is not possible to deliver a product to a customer while an order is being received from another customer.

SUMMARY OF THE INVENTION

One aspect of the present disclosure is to address the issues associated with some of the related art discussed above relating to a drive-through based order processing system, in which placement of an additional employee is required, and the technology can only be applied to a vehicle having a communication system.

Another aspect of the present disclosure is to address the issues associated with some of the related art discussed above in which order and delivery of a product cannot be implemented at the same time, even though order and delivery of a product are separated from each other.

Still another aspect of the present disclosure is to address an issue associated with some related art in which selecting a product in a drive-through takes a lot of time.

Yet another aspect of the present disclosure is to address an issue associated with some related art relating to a payment and saving service, in which the service is uniformly applied without discriminating between individual and group customers, thus ignoring characteristics of the customer.

Still another aspect of the present disclosure is to address an issue associated with some related art relating to a single takeout service, in which the service is provided without taking into account the product, weather, and characteristics of the vehicle.

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Further, it is understood that the objects and advantages of the present disclosure may be embodied by the means and a combination thereof in claims.

A method of processing a drive-through order according to an embodiment of the present disclosure may include receiving customer information detected through vision recognition, providing product information to a customer based on the customer information, and processing a product order of the customer.

In addition, the receiving of the customer information may include at least one of receiving customer information associated with vehicle information detected through vehicle recognition or receiving customer information associated with identification information detected through face recognition.

In addition, the drive-through order processing method may further include determining whether the customer is a pre-order customer based on the customer information. When the customer is determined to be a pre-order customer, the providing of the product information based on the customer information may include providing pre-order information using at least one of audio or video. The processing of the product order of the customer may include providing information for promptly guiding a vehicle to a pickup stand using at least one of audio or video and providing information that an additional order is available.

In addition, the product information based on the customer information may include a most recently ordered product component and a most frequently ordered product component in an order history of the customer information.

In addition, the receiving of the customer information may include receiving information about an age and gender of a passenger detected through face recognition. The providing of the product information to a customer based on the customer information may include providing recommended menu information differentiated according to the age and gender.

In addition, the processing of the product order of the customer may include determining a product component in a past order history or a component modified from the product component as a product order.

In addition, the processing of the product order of the customer may include paying a product price according to biometrics-based authentication through a communication system of a vehicle or a mobile terminal.

In addition, the processing of the product order of the customer may include issuing a payment number for a divided payment, and performing divided payments according to payment requests of a plurality of mobile terminals to which payment numbers are inputted.

In addition, the processing of the product order of the customer further may include accumulating mileage in an account corresponding to a mobile terminal undergoing a payment.

In addition, the processing of the product order of the customer further may include suggesting a takeout packaging method according to a temperature of a product, an atmospheric temperature, weather, and a vehicle type.

A drive-through order processing apparatus according to another embodiment of the present disclosure may include a transceiver configured to receive customer information detected through vision recognition, a digital signage for providing product information based on the customer information to a customer, and a processor configured to process a product order of the customer.

In addition, the transceiver may receive at least one of customer information associated with vehicle information detected through vehicle recognition, or customer information associated with identification information detected through face recognition.

In addition, the processor may determine whether the customer is a pre-order customer based on the customer information, and when the customer is determined to be a pre-order customer, the processor may perform a control operation to provide pre-order information, and control the digital signage to output information for promptly guiding a vehicle to a pickup stand and provide information that an additional order is available.

In addition, the product information based on the customer information may include a most recently ordered product component and a most frequently ordered product component in an order history of the customer information.

In addition, the transceiver may receive information about an age and gender of a passenger detected through face recognition, and the processor may control the digital signage to provide recommended menu information differentiated according to the age and gender.

In addition, the processor may determine a product component in a past order history or a component modified from the product component as a product order.

In addition, the processor may pay a product price according to biometrics-based authentication through a communication system of a vehicle or a mobile terminal.

In addition, the processor may issue a payment number for a divided payment, and perform divided payments according to requests of a plurality of mobile terminals to which payment numbers are inputted.

In addition, the processor may accumulate mileage in an account corresponding to a mobile terminal undergoing a payment.

In addition, the processor may control the digital signage to suggest a takeout packaging method according to a temperature of a product, an atmospheric temperature, weather, and a vehicle type.

According to the present disclosure, a time taken to process a product order can be minimized by processing the product order using a past transaction history.

In addition, a differentiated service according to the age and gender of the customer may be provided based on customer recognition.

In addition, a differentiated takeout service may be provided according to the product, the weather, and features of the vehicle.

DETAILED DESCRIPTION

Figure 1:
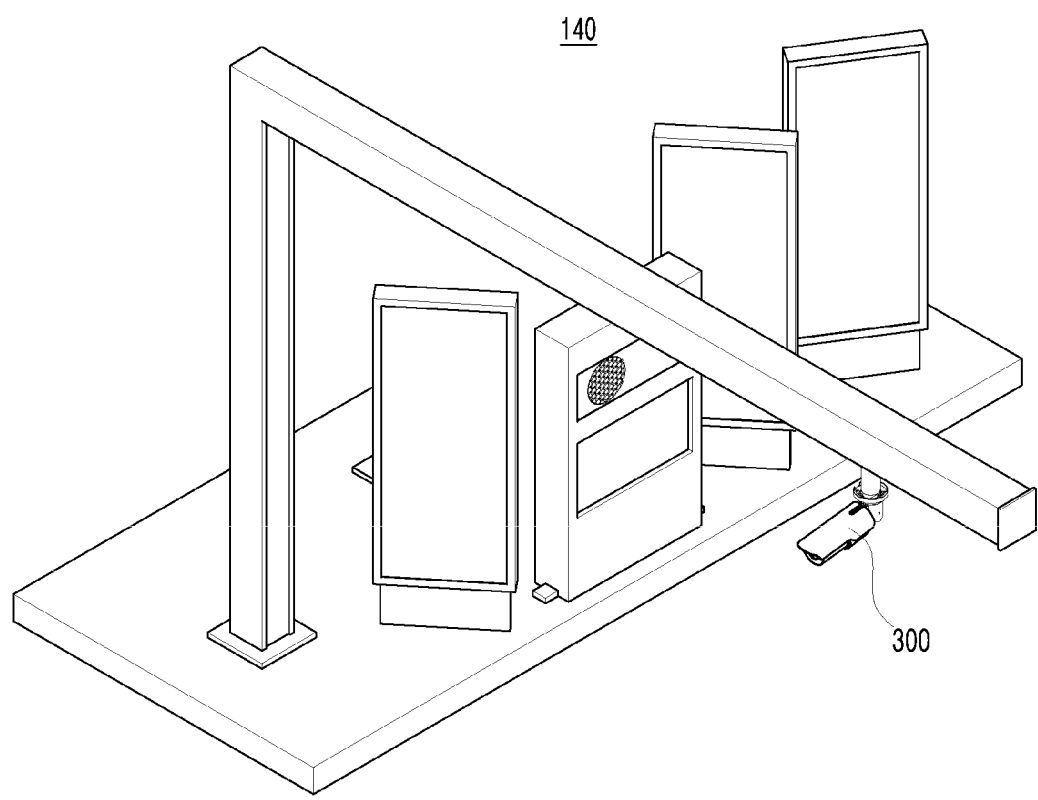
FIG. 1 is an illustrative diagram of a digital signage of a drive-through order processing apparatus according to an embodiment of the present disclosure.

Hereinafter, embodiments of the present disclosure will be described in detail with reference to the accompanying drawings, and the same or similar components will be given the same reference numerals regardless of reference symbols, and redundant description thereof will be omitted. In the following description, the terms "module" and "unit" for referring to elements are assigned and used exchangeably in consideration of convenience of explanation, and thus, the terms per se do not necessarily have different meanings or functions. Further, in describing the exemplary embodiment disclosed in the present specification, when it is determined that a detailed description of a related publicly known technology may obscure the gist of the exemplary embodiment disclosed in the present specification, the detailed description thereof will be omitted. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is an illustrative diagram of a digital signage of a drive-through order processing apparatus according to an embodiment of the present disclosure.

Referring to FIG. 1, some components of the drive-through order processing apparatus according to the embodiment of the present disclosure are depicted. The drive-through order processing apparatus 100 may be configured to include an indoor unit and an outdoor unit. A digital signage 140 and a vision recognition camera 300 corresponding to the outdoor unit are depicted.

The digital signage 140, which has an artificial intelligence (AI) function, may perform an audio and video input and output function for a passenger visiting a store to buy a product, for example, fast food such as a hamburger or coffee by drive-through.

The digital signage 140 may be installed between a vehicle driveway and a pickup location as a place for receiving a customer order. At least one digital signage 140 may be installed, and each of a plurality digital signages 140 may display differential display information for each function.

The camera 300 may photograph a vehicle entering toward the digital signage 140, and transmit an image of a license plate of the vehicle and a face of a passenger to a vision recognition system. The camera 300 may be installed at a position at which the license plate of the entering vehicle and the face of the passenger can be easily photographed. A position of the camera 300 shown in FIG. 1 is one of various embodiments.

Figure 2:
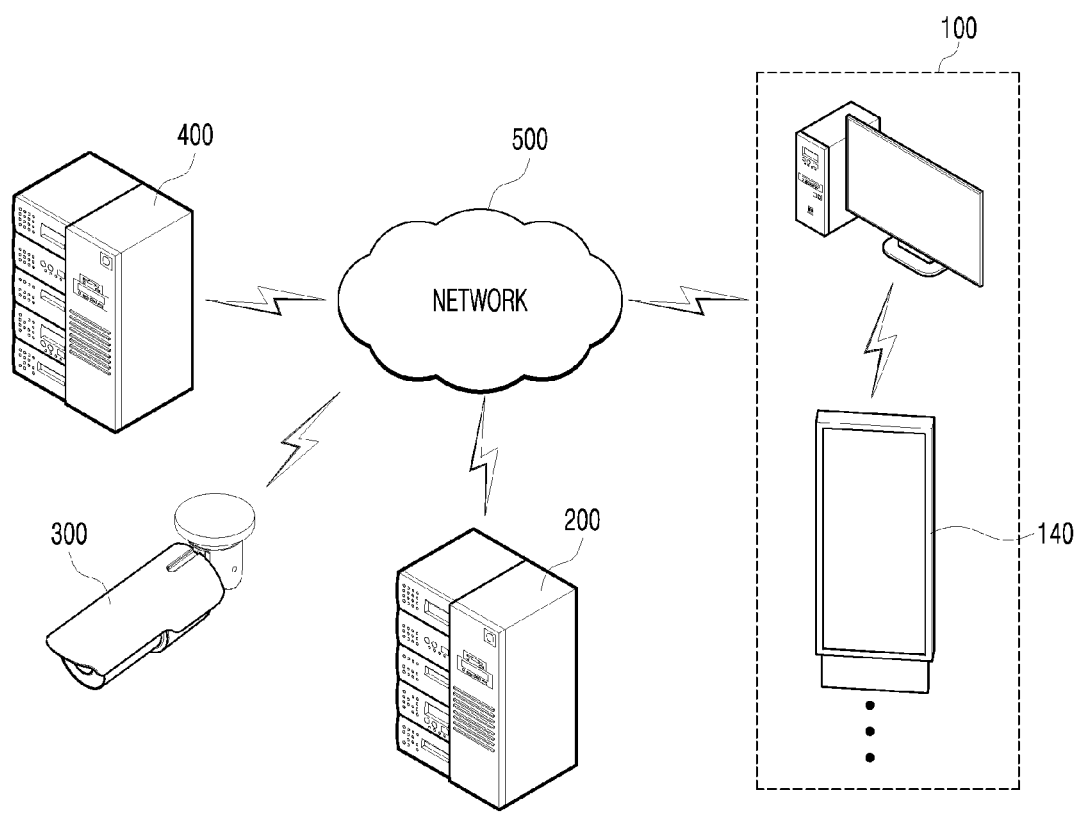
FIG. 2 is an illustrative diagram of a network environment connected to the drive-through order processing apparatus according to the embodiment of the present disclosure.

FIG. 2 is an illustrative diagram of a network environment connected to the drive-through order processing apparatus according to the embodiment of the present disclosure.

Referring to FIG. 2, the drive-through order processing apparatus 100 according to this embodiment of the present disclosure and servers 200 and 400 may be communicatively connected through a network 500. The drive-through order processing apparatus 100 may be provided at a branch providing a drive-through service, and the servers 200 and 400 may be provided at a head office managing at least one branch. Therefore, the drive-through order processing apparatus 100 according to this embodiment of the present disclosure corresponds to a terminal 100 provided in at least one branch.

The terminal 100 is a device for providing the drive-through service, and may be configured to include an indoor unit installed in the branch office and the digital signage 140 installed outdoors. The digital signage 140 may serve as an advertisement board, display product information for a drive-through customer, and serve as an input and output device for speech processing.

The server 200, which corresponds to a learning device, serves to provide various services related to an AI model to the terminal 100 according to an embodiment of the present disclosure. Detailed description of the AI model will be provided below.

The camera 300 may be configured to include an embedded system. Therefore, the camera 300 may be controlled and managed by the server 400 of the head office as a CCTV used for traffic control.

The camera 300 may transmit an image of the face of the customer and the license plate of the vehicle to the server 400 provided at the head office. In addition, customer information may be detected through an image processing process of the captured image.

The image processing process for detecting customer information may be performed by a separate server 400 provided at the head office. Accordingly, the terminal 100 may receive customer information as a result of vision recognition according to image processing by the server 400, and use the information to provide a customer information-based service to the customer.

The network 500 may be any appropriate communication network including wired and wireless networks, such as a local area network (LAN), a wide area network (WAN), the Internet, an intranet, and an extranet, and a mobile network such as cellular, 3G, LTE, 5G, a Wi-Fi network, an AD hoc network, and a combination thereof.

The network 500 may include connection of network elements such as hubs, bridges, routers, switches, and gateways. The network 500 may include one or more connected networks, including a public network such as the Internet and a private network such as a secure corporate private network. For example, the network may include a multi-network environment. Access to the network 500 may be provided via one or more wired or wireless access networks.

The terminal 100 may transmit and receive data with the server 200, which is a learning device, through a 5G network. Specifically, the terminal 100 may perform data communication with the learning device 200 using at least one service of enhanced mobile broadband (eMBB), ultra-reliable and low latency communications (URLLC), or massive machine-type communications (mMTC), through the 5G network.

eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the high-volume traffic may be accommodated in an area where user mobility is low and user density is high. Through broadband coverage, a wide-range and stable wireless environment and user mobility may be guaranteed.

The URLLC service defines requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. The mMTC enables a much larger number of terminals 300, such as sensors, than general mobile cellular phones to be simultaneously connected to a wireless access network. In this case, the communication module price of the terminal should be inexpensive, and there is a need for improved power efficiency and power saving technology capable of operating for years without battery replacement or recharging.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons.

In addition, the artificial neural network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network is composed of an input layer and an output layer.

In addition, a general multi-layer neural network is composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an artificial neural network trained using training data may be referred to as a trained model.

Hereinbelow, learning paradigms of an ANN will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

In addition, throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

Meanwhile, the training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of ANNs using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, an AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an ANN may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the ANN is first trained by experimentally setting hyperparameters to various values, and based on the results of training, the hyperparameters can be set to optimal values that provide a stable learning rate and accuracy.

The terminal 100 according to the embodiment of the present disclosure may utilize an AI model in speech processing for a conversation with a customer and face recognition of the customer for detection of customer information. A server corresponding to the learning device 200 may generate various AI models, learn the models, and complete the models through evaluation. The terminal 100 may perform natural language processing of voice and image processing of a captured image using an AI model stored in the server 200 or an AI model downloaded from the server 200 and stored in a local area. In addition, the terminal 100 may train the AI model using individual data about a customer collected at the branch.

The terminal 100 may perform a function of a voice agent. The voice agent may be a program that recognizes a voice of the customer and outputs a voice responding to a customer speech.

Figure 3:
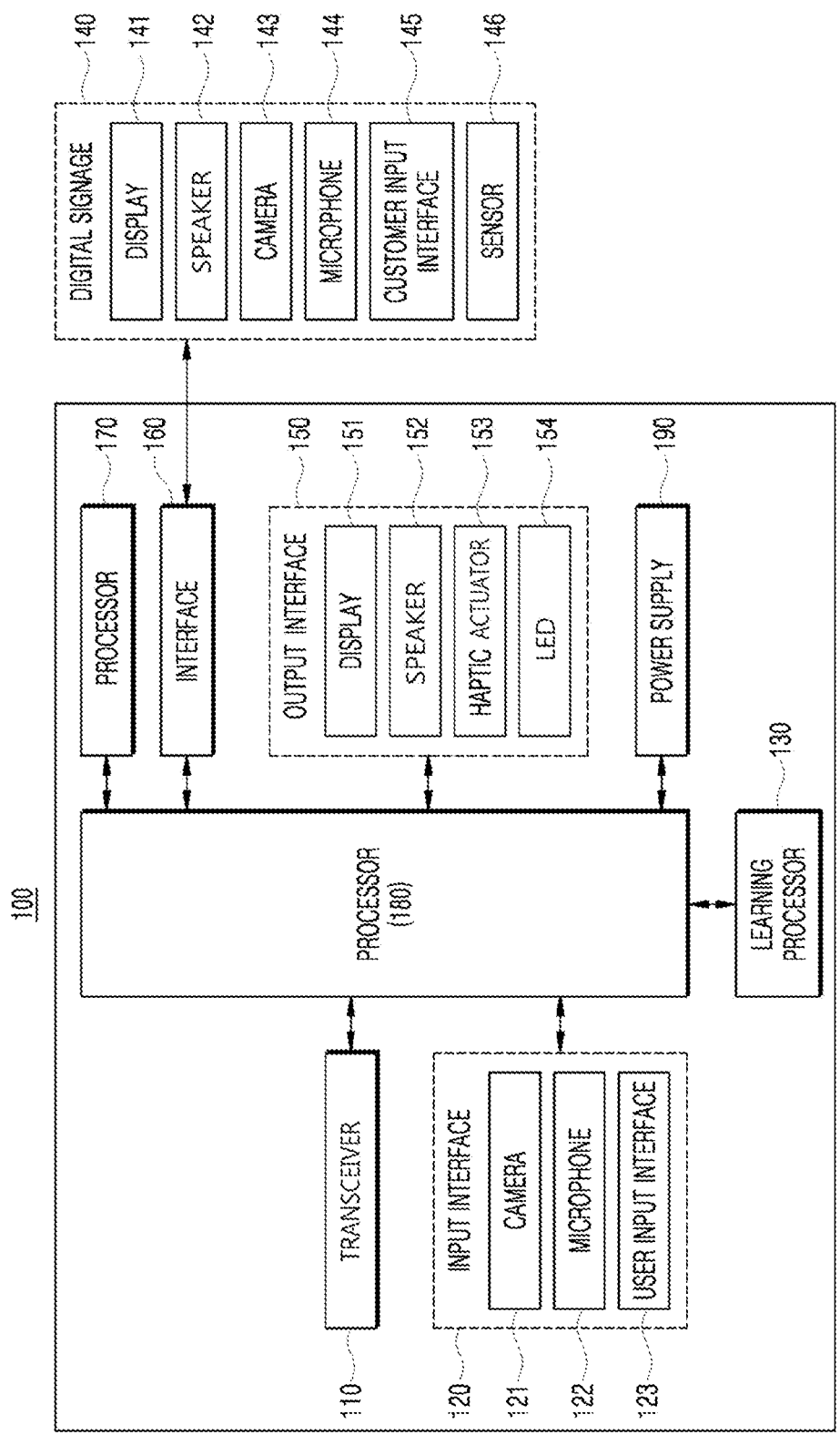
FIG. 3 is a block diagram of the drive-through order processing apparatus according to the embodiment of the present disclosure.

FIG. 3 is a block diagram of the drive-through order processing apparatus according to the embodiment of the present disclosure.

Referring to FIG. 3, the terminal 100 may include a transceiver 110, an input interface 120, a learning processor 130, the digital signage 140, an output interface 150, an interface 160, and a memory 170, a processor 180 and a power supply 190.

A trained model may be loaded in the terminal 100.

The trained model may be implemented as hardware, software, or a combination of hardware and software, and in cases where the trained model is partially or entirely implemented as software, at least one command constituting the trained model may be stored in the memory 170.

The transceiver 110 may be configured to include wired and wireless communication modules required for communication with the digital signage 140, for example, a short range communication module, a serial communication module, and an Ethernet module required for communication with the servers 200 and 400.

The input interface 120 may include a camera 121 which inputs an image signal, a microphone 122 which receives an audio signal, and a user input interface 123 which receives information from the user.

Voice data or image data collected by the input interface 120 is analyzed to be processed as a control command of the user.

The input interface 120 may obtain data such as training data for training a model, and input data used to obtain an output using the trained model.

The input interface 120 may obtain unprocessed input data, and in this case, the processor 180 or the learning processor 130 may preprocess the obtained data and generate training data or preprocessed input data which can be inputted for model training.

Here, the preprocessing of input data may refer to extracting an input feature from the input data.

The input interface 120 is for inputting of image information (or signal), audio information (or signal), data, or information being inputted from a user. For example for inputting of the image information, the terminal 100 may be provided with one or more cameras 121.

An image of a clerk captured by the camera 121 installed in the indoor unit may be displayed on a display 141 of the digital signage 140, which is the outdoor unit.

The user input interface 123 may receive information from a user, and when the information is inputted through the user input interface 123, the processor 180 may control the operation of the terminal 100 so as to correspond to the inputted information.

The user input interface 123 may include a mechanical input interface (or a mechanical key, for example, a button located on a front, rear, or side surface of the terminal 100, a dome switch, a jog wheel, or a jog switch) and a touch type input interface. For example, the touch type input interface may be formed by a virtual key, a soft key, or a visual key which is disposed on the touch screen through a software process or a touch key which is disposed on a portion other than the touch screen.

The learning processor 130 trains the model configured by an ANN using the training data.

Specifically, the learning processor 130 repeatedly trains the ANN using various training schemes previously described to determine optimized model parameters of the ANN.

Throughout the present specification, an artificial neural network of which parameters are determined by being trained using training data may be referred to as a trained model.

Here, the trained model may be used to infer result values for the new input data, rather than the training data.

The learning processor 130 may be configured to receive, classify, store, and output information to be used for data mining, data analysis, intelligent decision making, and machine learning algorithm and techniques.

The learning processor 130 may include one or more memories configured to store data which is received, detected, sensed, generated, previously defined, or output by another component, device, the terminal, or a device which communicates with the terminal.

The learning processor 130 may include a memory which is combined with or implemented in the terminal. In some exemplary embodiments, the learning processor 130 may be implemented using the memory 170.

Selectively or additionally, the learning processor 130 may be implemented using a memory related to the terminal, such as an external memory which is directly coupled to the terminal or a memory maintained in the server which communicates with the terminal.

According to another exemplary embodiment, the learning processor 130 may be implemented using a memory maintained in a cloud computing environment or other remote memory locations accessible by the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

Examples of such algorithms include, for example, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, and automated planning.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the at least one executable operation.

The processor 180 may perform various functions which implement intelligent emulation (that is, a knowledge-based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processor, an environmental condition module, a speech to text (STT) processor, a natural language processor, a workflow processor, and a service processor.

The sub modules may have access to one or more systems or data and a model, or a subset or a super set of those in the terminal. Further, each of the sub modules may provide various functions including a glossarial index, user data, a workflow model, a service model, and an automatic speech recognition (ASR) system.

According to another exemplary embodiment, another aspect of the processor 180 or the terminal may be implemented by the above-described sub module, a system, data, and a model.

In some exemplary embodiments, based on the data of the learning processor 130, the processor 180 may be configured to detect and sense requirements based on contextual conditions expressed by user input or natural language input or a user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage device through a transceiver.

The processor 180 collects usage history information from the terminal and stores the information in the memory 170.

The processor 180 may determine best matching to execute a specific function using stored usage history information and predictive modeling.

The processor 180 may receive or sense surrounding environment information or other information through the sensor 146.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology and updates the information which is previously learned based on the analyzed information.

Accordingly, the processor 180 may improve precision of a future performance of the data analysis and the machine learning algorithm and technology based on the updated information, together with the learning processor 130.

The digital signage 140 is an outdoor unit of the drive-through order processing apparatus 100, and is a device for communicating with a customer in a process of receiving and processing an order of the customer using the drive-through service. The indoor unit of the drive-through order processing apparatus 100 may generate video and audio output through the digital signage 140 and receive an input of a voice of a user using a microphone and an image of the customer using a camera. The digital signage 140 may be configured to include a display 141, a speaker 142, a camera 143, a microphone 144, a customer input interface 145, and a sensor 146.

The display 141 outputs information processed by the terminal 100. For example, the display 141 may display execution screen information of an application program driven in the terminal 100, or user interface (UI) and graphical user interface (GUI) information according to the execution screen information.

The display 141 may form a mutual layered structure with a touch sensor, or be formed integrally to be implemented as a touch screen. The touch screen may function as the customer input interface 145 providing an input interface between the digital signage 140 and the user, and provide an output interface between the digital signage 140 and the user.

The speaker 142 may output audio data received from the transceiver 110 or stored in the memory 170 in a call signal reception mode, a phone-call mode, a recording mode, a voice recognition mode, or a broadcasting reception mode.

The speaker 142 may include at least one of a receiver, a speaker, or a buzzer.

The camera 143 captures an image of the customer, and processes an image frame such as a still image or a moving image obtained by an image sensor. The processed image frame may be displayed on the display 151 or stored in the memory 170.

The camera 143 may be used to photograph the customer placing an order. Accordingly, the camera 143 is distinguished from the camera 300, which is used for the purpose of recognizing the license plate of the vehicle and the face of the customer. The camera 143 may be integrated with the digital signage 140 in a webcam format.

The microphone 144 is installed with the digital signage 140 to process an outdoor sound signal as electrical voice data. The processed voice data may be variously utilized according to a function being performed (or an application program being executed) in the drive-through order processing apparatus 100. Meanwhile, various noise reduction algorithms may be implemented in the microphone 144 to remove noise generated in a process of receiving the outdoor sound signal.

Through the microphone 144, the customer may select a menu number, a menu name, or previous order or a most frequently made order of a past transaction history displayed on the digital signage 140 using voice.

The customer input interface 145 may be used for order input of the customer. A configuration of the customer input interface 145 may be the same as a configuration of the user input interface 123.

The sensor 146 may be configured to include one or more sensors for sensing at least one of information about an outdoor environment in which the digital signage 140 is installed, for example, weather and temperature information, or customer information, for example, a state of a vehicle.

The interface 160 serves as a pathway between various types of external devices which are connected to the terminal 100. The interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The terminal 100 may perform appropriate control related to the connected external device in accordance with the connection of the external device to the interface 160.

The identification module is a chip in which various information for authenticating a usage right of the terminal 100 is stored, and may include a user identification module (UIM), a subscriber identify module (SIM), and a universal subscriber identity module (USIM). The device with an identification module (hereinafter, "identification device") may be manufactured as a smart card. Accordingly, the identification device may be connected to the terminal 100 through the interface 160.

The memory 170 stores data which supports various functions of the terminal 100.

The memory 170 may store various application programs (or applications) driven in the terminal 100, data for the operation of the terminal 100, commands, and data (for example, at least one algorithm information for machine learning) for the operation of the learning processor 130.

The memory 170 may store the trained model in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may not only be data which is processed to be suitable for the model learning but also input data itself which is not processed.

In addition to the operation related to the application program, the processor 180 may generally control an overall operation of the terminal 100. The processor 180 may process a signal, data, or information which is inputted or outputted through the above-described components, or drive the application programs stored in the memory 170 to provide or process appropriate information or functions to the user.

Further, in order to drive the application program stored in the memory 170, the processor 180 may control at least some of components described with reference to FIG. 3. Moreover, the processor 180 may combine and operate at least two of components included in the terminal 100 to drive the application program.

Meanwhile, as described above, the processor 180 may control an operation related to the application program and an overall operation of the terminal 100. For example, when the state of the terminal satisfies a predetermined condition, the processor 180 may execute or release a locking state which restricts an input of a control command of a user for the applications.

The power supply 190 receives application of external power or internal power to supply power to the components included in the terminal 100, under the control of the processor 180. The power supply 190 may be configured to include a battery or a power supply.

Figure 4:
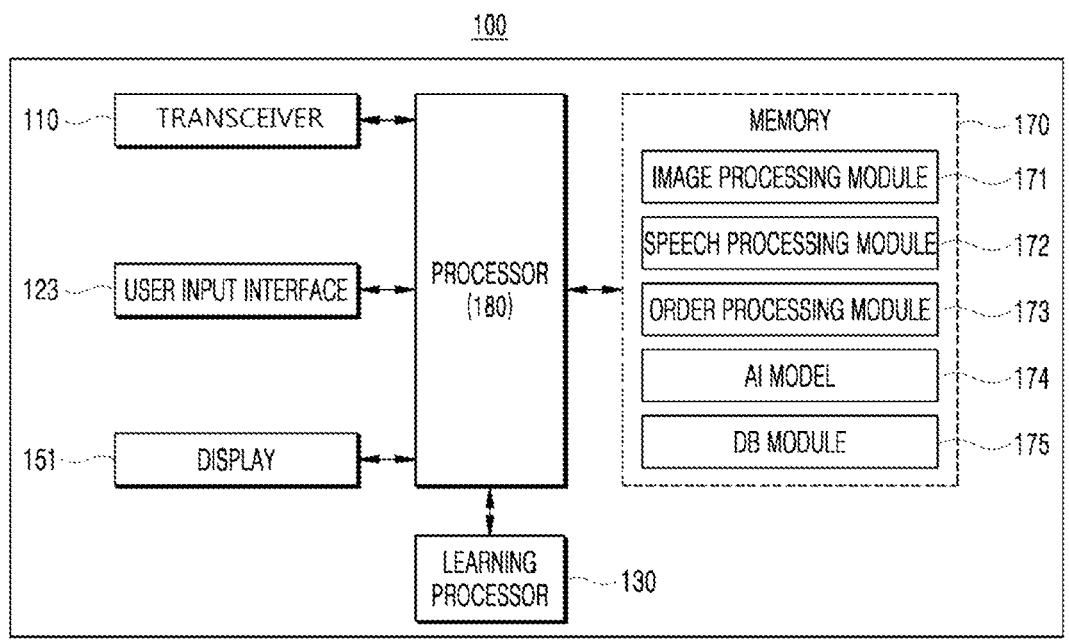
FIG. 4 is a block diagram of a memory of FIG. 3.

FIG. 4 is a block diagram of the memory of FIG. 3.

Referring to FIG. 4, components of the memory 170 included in the terminal 100 are briefly illustrated. In the memory 170, various computer program modules may be loaded. In addition to a system program managing an operating system and hardware, an image processing module 171, a speech processing module 172, an order processing module 173, an AI model 174, and a database (DB) module 175 may be included in a range of a computer program mounted in the memory 170. Here, some of the application programs may be implemented as hardware including an integrated circuit.

The processor 180 may be set to control the application program modules 171 to 175 mounted in the memory 170, and a corresponding function may be performed through each module according to this setting.

The application program modules may be set to include a command set for each function included in a drive-through order processing method according to an embodiment of the present disclosure. Functions of respective modules may be performed by the terminal 100 while various logic circuits included in the processor 180 read and execute a command set of various modules loaded in the memory 170.

In execution of a function included in the drive-through order processing method according to the embodiment of the present disclosure, the drive-through order processing apparatus 100 may use a core module stored in a local area, downloaded from the servers 200 and 400, or stored in the servers 200 and 400 as a core module performing a corresponding function.

The image processing module 171 may be used for image processing purposes required for vision recognition. Even when an image is collected by the camera 300 and the entire image is processed by the vision recognition system server 400, the image processing module 171 may be used for image preprocessing.

The speech processing module 172 may be used for natural language processing required to recognize the voice of the customer and output an answer thereto. A coverage range of the speech processing module 172 may include processing related to voice input and output, voice recognition, and natural language understanding and generation. Sound modeling, pronunciation modeling, and language modeling related to voice recognition may be processed in a separate natural language processing server.

The order processing module 173 may be used to confirm an order according to a selection of the customer, proceed with payment for the confirmed order, and process procurement information of an ordered product. Procurement information processing of the ordered product may be implemented in the form of sound effect output and product procurement information display through a speaker and a display board installed in a cooking part.

The AI model 174 may be implemented as an AI model generated by the learning device 200 and trained through learning, for example, an artificial neural network model that performs deep learning. The drive-through order processing apparatus 100 may use the artificial neural network model without change, or may perform secondary training on an initially-trained artificial neural network model using training data collected in a local area.

The DB module 175 may be used to collect customer information, store the customer information, update changed customer information, and detect stored customer information. The DB module 175 can use a separate DB management server, or can use customer information individually set as a database by each sales office in the local area.

Figure 5:
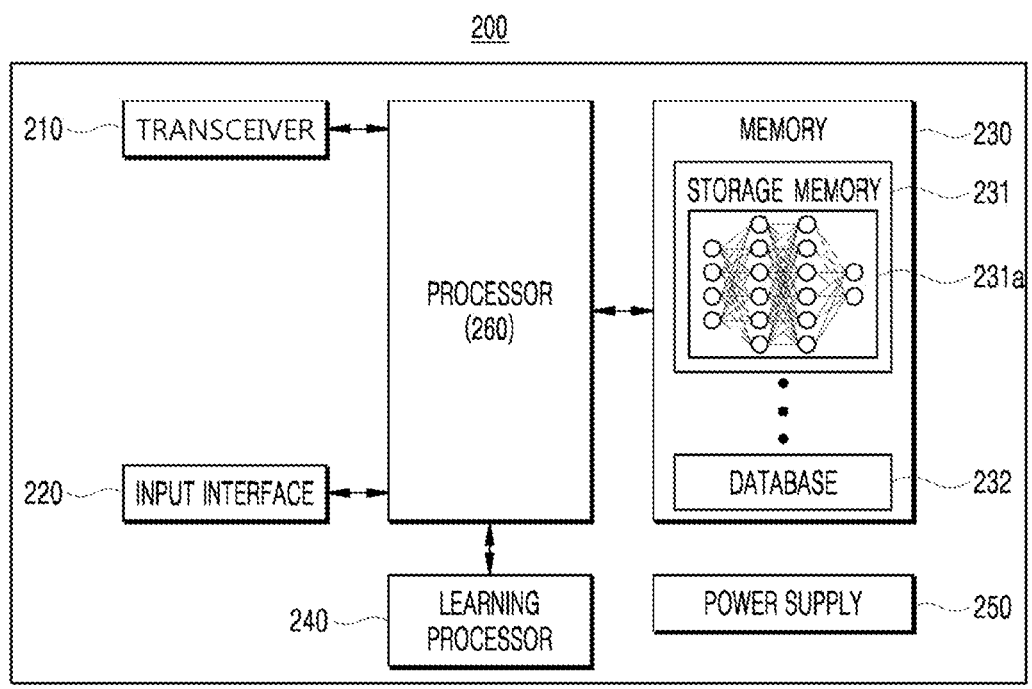
FIG. 5 is a block diagram of a learning device according to an embodiment of the present disclosure.

FIG. 5 is a block diagram of a learning device according to an embodiment of the present disclosure.

The learning device 200 is a device or a server which is separately configured outside of the terminal 100, and may perform the same function as the learning processor 130 of the terminal 100.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one terminal 100 and derive a result by analyzing or learning the data on behalf of the terminal 100. Here, "on behalf of the other device" may refer to a distribution of computing power by means of distributed processing.

The learning device 200 of the artificial neural network may be various devices for learning an artificial neural network, and normally refers to a server. The learning device 200 may be referred to as a learning device or a learning server.

Specifically, the learning device 200 may be implemented as a single server or as a plurality of server sets, a cloud server, or a combination thereof.

That is, the learning device 200 may be configured as a plurality of learning devices to configure a learning device set (or a cloud server), and at least one learning device 200 included in the learning device set may derive a result by analyzing or learning the data through distributed processing.

The learning device 200 may transmit a model trained by machine learning or deep learning to the terminal 100 periodically or upon request.

Referring to FIG. 5, the learning device 200 may include a transceiver 210, an input interface 220, a memory 230, a learning processor 240, a power supply 250, a processor 260, and so forth.

The transceiver 210 may correspond to a configuration including the wireless transceiver 110 and the interface 160 of FIG. 3. That is, the transceiver may transmit and receive data with the other device through wired/wireless communication or an interface.

The input interface 220 is a configuration corresponding to the input interface 120 of FIG. 3, and may obtain data by receiving the data through the transceiver 210.

The input interface 220 may obtain data such as training data for training a model, and input data used to obtain an output using the trained model.

The input interface 220 may obtain unprocessed input data, and in this case, the processor 260 may preprocess the obtained data to generate training data to be inputted to the model learning or preprocessed input data.

In this case, the preprocessing on the input data performed by the input interface 220 may refer to extracting of an input feature from the input data.

The memory 230 is a configuration corresponding to the memory 170 of FIG. 3.

The memory 230 may include a storage memory 231, a database 232, and so forth.

The storage memory 231 stores a model (or an artificial neural network 231*a*) which is learning or trained through the learning processor 240 and when the model is updated through the learning, stores the updated model.

If necessary, the storage memory 231 may store the trained model by dividing the model into a plurality of versions depending on a training timing or a training progress.

The artificial neural network 231*a* illustrated in FIG. 5 is one example of an artificial neural networks including a plurality of hidden layers, but the artificial neural network of the present disclosure is not limited thereto.

The artificial neural network 231*a* may be implemented as hardware, software, or a combination of hardware and software, and when the artificial neural network 231*a* is partially or entirely implemented as software, at least one command constituting the artificial neural network 231*a* may be stored in the memory 230.

The database 232 stores input data obtained from the input interface 220, learning data (or training data) used for model learning, a learning history of the model, and so forth.

The input data stored in the database 232 may be data which is processed to be suitable for model training, as well as unprocessed input data.

The learning processor 240 is a configuration corresponding to the learning processor 130 of FIG. 3.

The learning processor 240 may train the artificial neural network 231a using training data or a training set.

The learning processor 240 may train the artificial neural network 231a by immediately acquiring preprocessed input data that the processor 260 has obtained through the input interface 220, or obtain preprocessed input data stored in the database 232.

Specifically, the learning processor 240 may repeatedly train the artificial neural network 231a using various learning techniques described above to determine optimized model parameters of the artificial neural network 231a.

In this specification, an artificial neural network of which parameters are determined by being trained using training data may be referred to as a trained model.

Here, the trained model may be loaded in the learning device 200 to deduce result values, or may be transmitted to and loaded in other devices, such as the terminal 100, through the transceiver 210.

Further, when the trained model is updated, the updated trained model may be transmitted to and loaded in other devices, such as the terminal 100, via the transceiver 210.

The power supply 250 is a configuration corresponding to the power supply 190 of FIG. 3.

Redundant description for corresponding configurations will be omitted.

Figure 6:
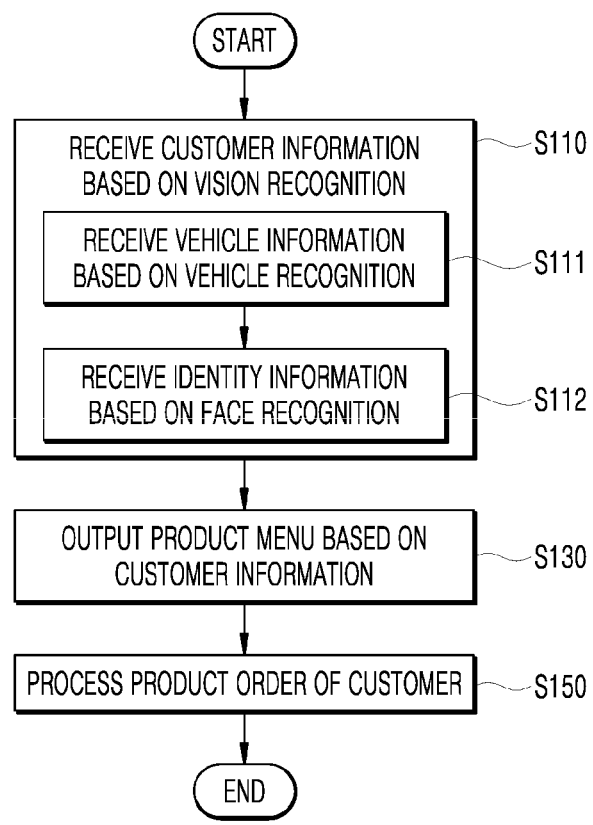
FIG. 6 is a flowchart of a drive-through order processing method according to an embodiment of the present disclosure.

FIG. 6 is a flowchart of a drive-through order processing method according to an embodiment of the present disclosure.

Referring to FIG. 6, the drive-through order processing method (S100) according to the embodiment of the present disclosure may be configured to include steps S110 to S150.

Here, the subject that performs each step included in the drive-through order processing method (S100) is the drive-through order processing apparatus 100, and specifically is the processor 180 that executes a computer command set for controlling the drive-through order processing method included in the program stored in the memory 170.

The processor 180 may be implemented as at least one of a central processing unit (CPU) or a graphics processing unit (GPU). Hereinafter, each step will be described in terms of the processor 180, which is an execution subject of the drive-through order processing method according to the embodiment of the present disclosure.

The vision recognition process described in the present disclosure may be configured to include image acquisition, preprocessing, face detection, image correction, and face recognition. A process after the image acquisition may be performed by the server 400 or the processor 180.

When the camera 300 can be installed toward the front of the vehicle entering the digital signage 140, the camera 300 may acquire an image required for recognizing the license plate of the vehicle and the face of the passenger riding in the vehicle.

The preprocessing may include noise reduction and image segmentation processes. The preprocessing process may be performed at least once before and after face region detection. Prior to the face region detection, preprocessing may be performed primarily for noise reduction.

The face detection process may include image segmentation, face region detection, and eye region detection for the face region detection.

Preprocessing for the face region may be included in the vision recognition process, which may include correction of an image, for example, brightness control and geometric standardization.

When the face region, particularly, the eye region is detected, a facial feature may be extracted and a template may be generated. Subsequently, an identity of the customer can be detected by comparing the template with a face database.

As an example of the face recognition of the drive-through order processing method according to the embodiment of the present disclosure, at least one of a geometric method, Eigencaces, Fisherfaces, SVM, deep neural networking, a method of simultaneously using fuzzy and neural networks, or a method of using Wavelet and Elastic Matching may be used.

As an algorithm that can be used for face recognition and license plate recognition, OpenCV is one open source computer vision library that can be used for image processing, vision recognition, machine learning, and deep learning. OpenCV was first developed by Intel, and is currently available on a variety of operating systems, for example, Windows, Linux, OS X, iOS, and Android. OpenCV is a library specifically focused on real-time image processing.

The processor 180 may receive customer information detected through vision recognition (S110).

A vehicle driven by a customer desiring to use a drive-through service enters the digital signage 140, and the installed camera 300 captures a vehicle image for vehicle identification. The captured vehicle image may be transmitted to the vision recognition server 400, and the vision recognition server 400 may detect the customer information using the license plate recognition and the face recognition based on a customer information database. The detected customer information is received by the terminal 100. Here, the vision recognition server 400 does not necessarily correspond to a separate server, and the drive-through order processing apparatus 100 and the vision recognition server 400 may use the same physical server.

The customer information may include vehicle information based on vehicle recognition and identity information based on face recognition. In the case of a customer revisiting a corresponding branch that provides the drive-through service, a vehicle number, personal information of the customer, for example, gender, age group, and contact information, may be registered in the customer information database in advance.

Reception of the customer information may include at least one of reception of the customer information associated with vehicle information detected through vehicle recognition (S111) or reception of the customer information associated with identity information detected through face recognition (S112). For example, when a vehicle of one driver enters, customer information may be detected through vehicle number recognition.

When a vehicle of one driver enters, a vision recognition system including the camera 300 and the server 400 may detect customer information only by vehicle number recognition. When an entering vehicle is a vehicle of two or more drivers, accurate customer information may be detected through additional driver face recognition.

The processor 180 may output product information based on the customer information (S130). In the case of a customer whose customer information is registered in advance, display information in which a previous order history and a menu are outputted together may be provided to the customer.

Figure 7:
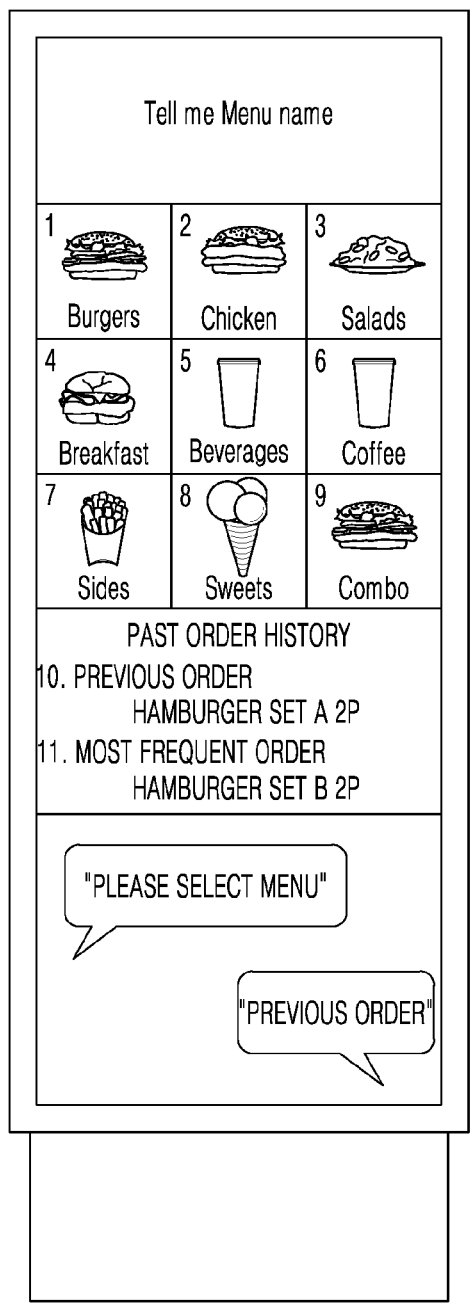
FIG. 7 is an illustrative diagram of product information display in FIG. 6.

FIG. 7 is an illustrative diagram of product information display in FIG. 6.

Referring to FIG. 7, following product information display of item number 1 to item number 9, ordered items in a past order history of the customer are displayed at item number 10 and item number 11, respectively. In other words, in the past order history, a most recently ordered item is displayed at item number 10, and a most frequently ordered item is displayed at item number 11.

The processor 180 may display product information and output a guide voice for order processing through the digital signage 140. Referring to FIG. 7, under the menu display, the conversation details of an AI assistant and the customer are displayed in the form of speech balloons, and contents of the speech balloons may be outputted as a voice through a speaker.

The processor 180 may process a product order of the customer (S150). Specifically, a product order processing process may be configured to include receiving a menu selection from a customer, displaying a menu and amount selected for menu confirmation, payment for a product, and sending a product procurement request.

Here, the product procurement request may be implemented in the form of a sound effect output and a product procurement information display through a speaker and a display board installed in the cooking part.

Among the displayed menus, for example, menus of item number 1 to item number 9, the customer may utter a number or a menu name, or make an utterance selecting a previous order item or a most frequent order item in the past order history. In addition, the processor 180 may determine the order of the customer by recognizing the voice of the customer. Voice recognition for speaking of the customer may be processed in the terminal 100 or in a separate voice recognition server.

Figure 8:
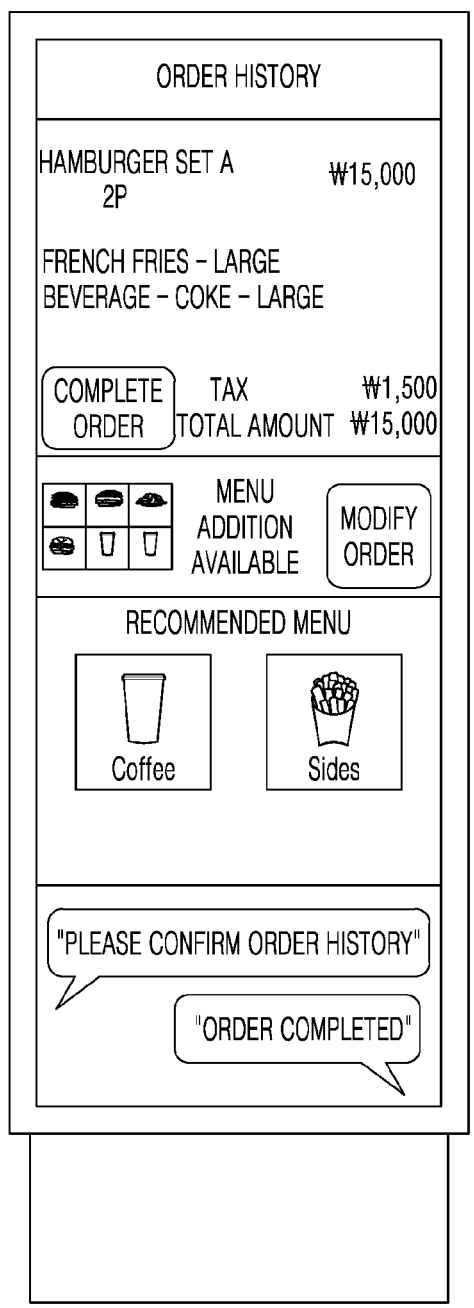
FIG. 8 is an illustrative diagram of product order processing in FIG. 6.

FIG. 8 is an illustrative diagram of product order processing in FIG. 6.

A step of processing the product order of the customer may include a step of determining a product component in the past order history or a component modified from the product component as a product order.

Referring to FIG. 7 and FIG. 8, the customer selects 'previous order' by voice, and a voice recognition result is displayed at the bottom of FIG. 7. FIG. 8 depicts a view of the digital signage for confirming the previous order of the customer. The customer can confirm the order by selecting "complete order" or modify the order by selecting "modify order". In FIG. 8, the voice recognition result is displayed as "order completed" in the digital signage 140 in response to a request for "complete order" from the customer.

A step of providing product information to the customer based on the customer information may be configured to include a step of providing recommendation menu information differentiated according to the age and gender of the customer.

Referring to FIG. 8 again, a recommendation menu is displayed at the bottom of an order modification menu in the view of the digital signage 140. In order to display a recommendation menu for each customer, in a customer information receiving step, the age and gender information of the passenger detected through face recognition may be received.

The step of processing the product order of the customer may be configured to include a step of paying a product price in accordance with biometrics-based authentication via a vehicle communication system or a mobile terminal.

According to the drive-through order processing method (S100) according to the embodiment of the present disclosure, the processor can complete identity verification for payment by credit card, which is a payment instrument, using a terminal of the customer or a communication system of the vehicle without transfer of the payment instrument, for example, the credit card. A card application related to the credit card included in the customer information is installed in the customer terminal, and the customer can input a password using the customer terminal or the communication system of the vehicle linked thereto, or input biometric information, for example, a fingerprint, during payment. In this case, a wireless LAN, for example, a Wi-Fi service, may be provided to the customer for smooth operation of the card application of the customer terminal.

Hereinafter, various embodiments of the drive-through order processing method (S100) will be described.

Figure 9:
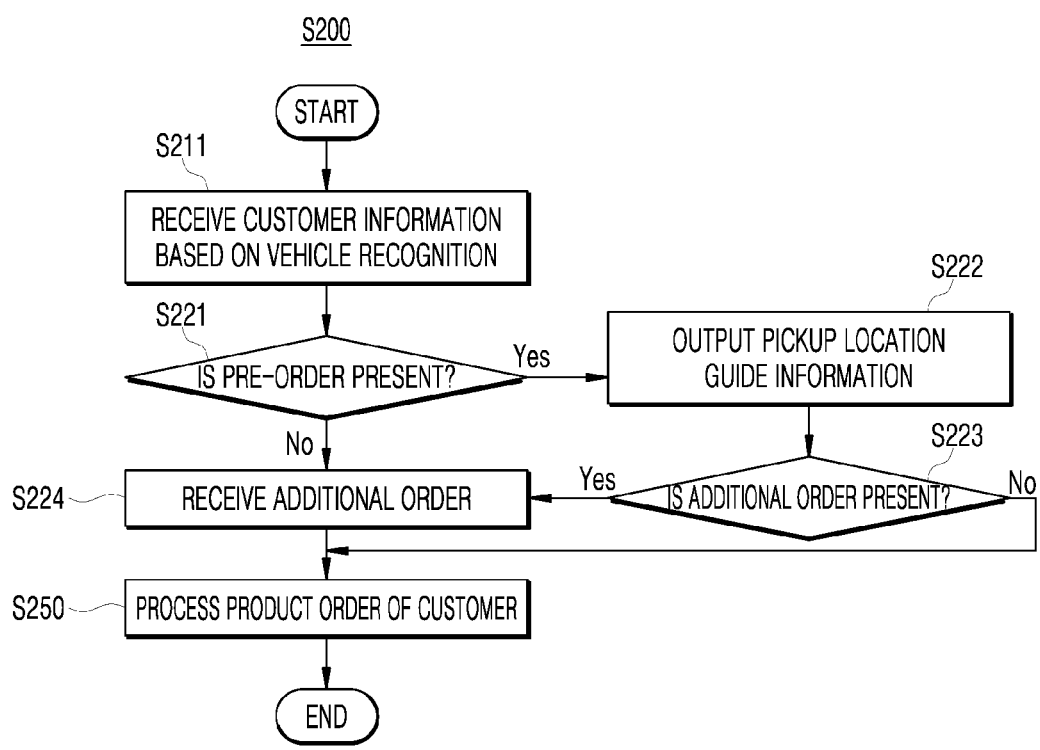
FIG. 9 is a flowchart of a drive-through order processing method according to an embodiment of the present disclosure.

FIG. 9 is a flowchart of a drive-through order processing method according to an embodiment of the present disclosure.

The drive-through order processing method (S100) may be configured to further include determining whether the customer is a pre-order customer based on the customer information. A pre-order is a form of order in which an order is placed in advance through a communication means, for example, by phone, and an ordered product is picked up using the vehicle.

Referring to FIG. 9, the processor 180 may receive customer information detected through a vehicle number or face recognition (S211) and determine whether a customer of an entering vehicle corresponds to a pre-order customer using the customer information (S221). When the customer is determined to be a pre-order customer, pre-order information may be provided using at least one of audio or video. For example, a vehicle number may be recognized, and information indicating whether the vehicle is a pre-order vehicle may be displayed together with the recognized vehicle number through, for example, an LED display device. In addition, the information indicating whether the vehicle is a pre-order vehicle may be outputted as a voice through the speaker. In this case, after the vehicle enters, the pre-order customer may proceed directly to the pickup location without passing through an order location according to at least one of a display guide or a voice guide corresponding to a guide to the pickup location. The customer may be informed that an additional order is available.

It is then determined whether an additional order of the customer is made (S223). When an additional order of the customer is made, additional order processing is performed (S250). Additional order processing may include payment and delivery of an additionally ordered product at the pickup location.

When an additional order of the customer is not made, pre-order processing is performed. Pre-order processing may include payment of an unpaid amount and delivery of a product at the pickup location.

Figure 10:
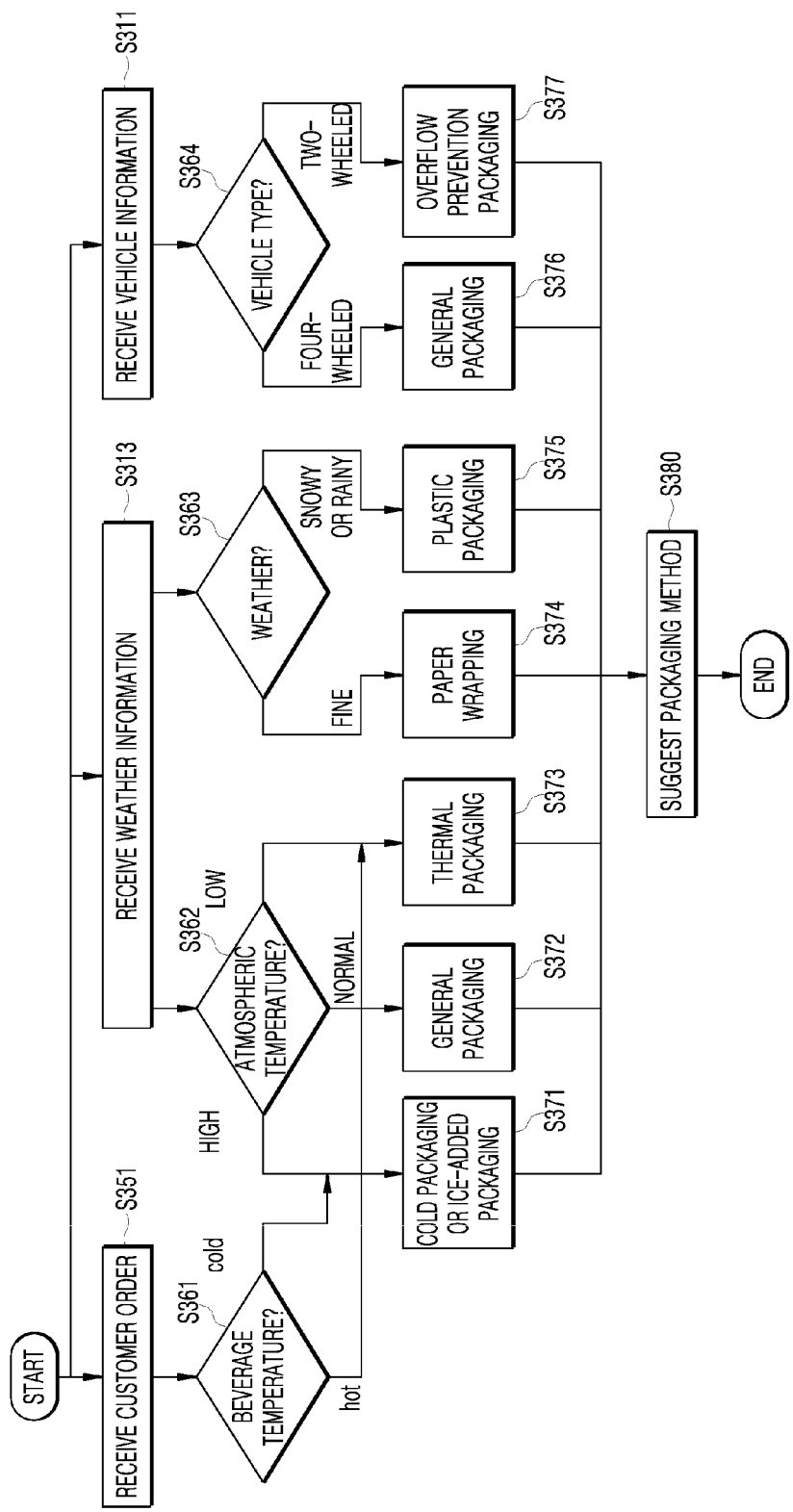
FIG. 10 is a flowchart of a drive-through order processing method according to an embodiment of the present disclosure.

FIG. 10 is a flowchart of a drive-through order processing method according to an embodiment of the present disclosure.

Product order processing for the customer may be configured to include a proposal of a takeout packaging method according to a temperature of a product, an atmospheric temperature, weather, and a vehicle type.

Referring to FIG. 10, the processor 180 may receive weather information through a server such as a meteorological office (S313). The processor 180 may use the weather information to recognize an atmospheric temperature distribution, for example, whether the atmospheric temperature corresponds to a high temperature, a normal temperature, or a low temperature, and whether the weather corresponds to rainy or snowy weather.

The processor 180 receives an order from the customer for order processing (S351).

The processor 180 may determine a beverage temperature according to order information (S361). In addition, the processor 180 may determine the atmospheric temperature based on weather information (S362).

When the atmospheric temperature is high, the processor 180 may suggest a packaging method of cold packaging or ice-added packaging for a cold beverage to the customer using at least one of audio or video (S371).

When the atmospheric temperature is normal, a general packaging (S372) method may be suggested to the customer.

When the atmospheric temperature is low, thermal packaging for a hot beverage, for example, attaching a stick stopper to a beverage container may be suggested to the customer (S373, S380).

The processor 180 may determine whether it is rainy or snowy based on weather information (S363). When the weather is fine, a paper wrapping method may be suggested to the customer to protect the environment (S374, S380).

When it is rainy or snowy, a plastic packaging method may be suggested to the customer to prevent the packaging from getting wet (S375, S380).

In addition, the processor 180 may suggest a packing method suitable for the customer according to the type of the vehicle driven by the customer.

The processor 180 may receive vehicle information (S311), and receive an order from the customer using the vehicle information (S351). In addition, the processor 180 may determine whether the customer vehicle has four wheels or two wheels using the vehicle information according to the vehicle recognition (S364).

When the customer vehicle has four wheels, a general packaging method may be suggested to the customer (S376, S380). When the customer vehicle has two wheels, like a bicycle or a motorbike, an overflow prevention packaging method may be suggested to the customer (S377, S380).

Figure 11:
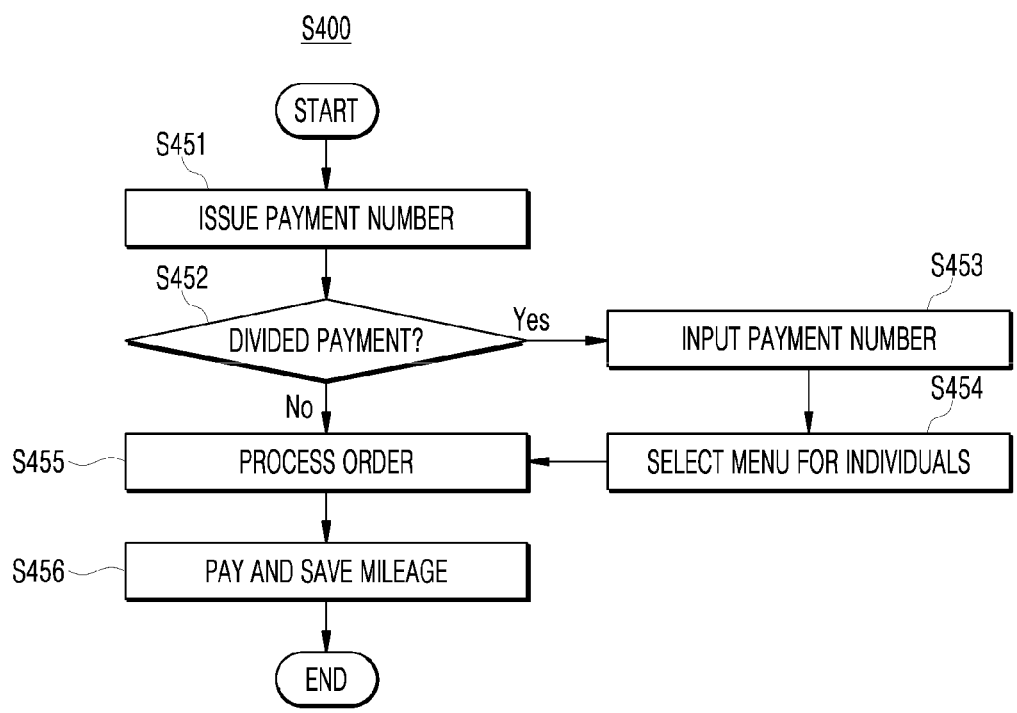
FIG. 11 is a flowchart of a drive-through order processing method according to an embodiment of the present disclosure.

FIG. 11 is a flowchart of a drive-through order processing method according to an embodiment of the present disclosure.

A step of processing a product order of the customer may be configured to include a step of issuing a payment number for a divided payment, and a step of performing divided payments according to payment requests of a plurality of mobile terminals to which payment numbers are inputted.

Referring to FIG. 11, a process of performing a divided payment for one order is described. The divided payment according to the embodiment of the present disclosure is distinguished from the case where each individual of a plurality of people makes separate payments from the beginning, since the divided payment according to this embodiment corresponds to a payment for each individual using a personal terminal for a menu included in one order.

First, when one order is determined according to menu selection, a payment number for the order is issued (S451). The payment number is used to distinguish the order from other orders, and a name may be expressed as an order ID.

Subsequently, it is determined whether a divided payment is to be used, based on a request of the customer (S452). In a case in which a plurality of customers are riding in the vehicle, when the divided payment is used, there is an advantage in that payment is carried out using a payment instrument owned by each customer, and customer mileage can be earned for each customer.

When the divided payment is requested, each of a plurality of customers may use a payment instrument to pay for a product selected by the customer. Here, payment using an application card as a payment instrument will be described as an example. Each customer can input a payment number to a terminal of the customer (S453).

When a payment number is inputted for each customer terminal according to a user input, the customer terminal displays an ordered menu according to the payment number. Each customer may select a menu ordered by the customer (S454), and request order processing for the corresponding menu. At the request of the customer, the processor 180 divides and processes the first one order. That is, one order may be processed as a modified plurality of orders (S455).

Payment may be made through each terminal, and the customer mileage according to the divided payment can be divided and saved in the account of each terminal owning customer (S456).

In the case of non-divided payment, payment may be made using one payment instrument, and customer mileage may be saved for the customer providing the payment instrument.

Figure 12:
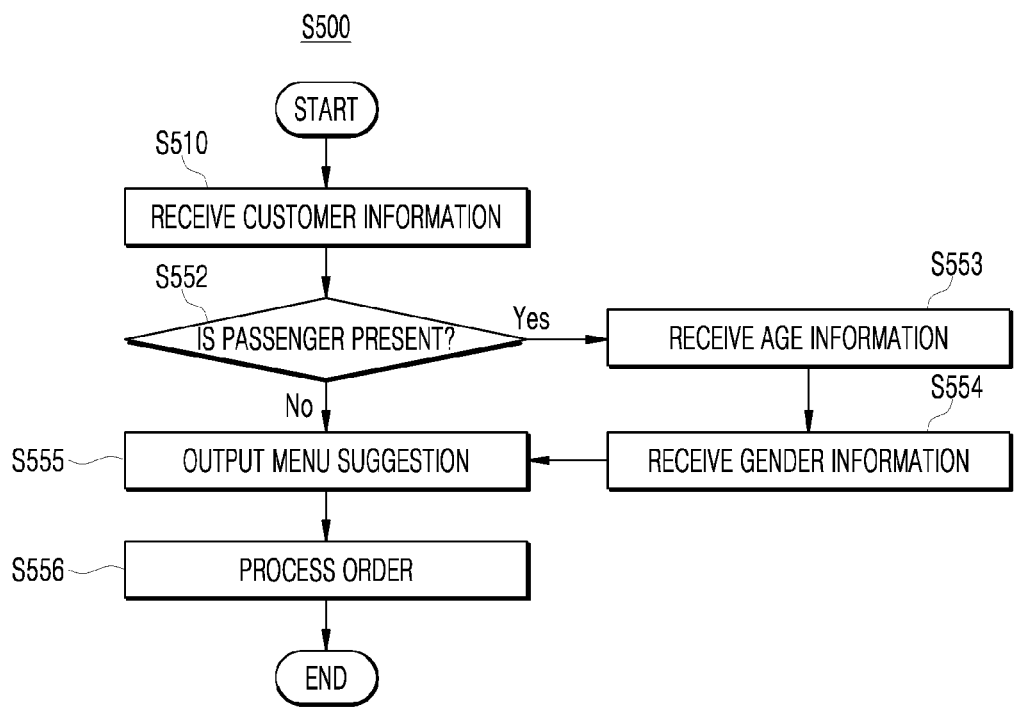
FIG. 12 is a flowchart of a drive-through order processing method according to an embodiment of the present disclosure.

FIG. 12 is a flowchart of a drive-through order processing method according to an embodiment of the present disclosure.

Referring to FIG. 12, a process of confirming the presence of both a driver and a passenger among passengers of the vehicle, and suggesting a menu for the passenger, is described.

The processor 180 may receive detected customer information from the server 400 based on vision recognition (S510).

Customer information can be detected by the following process. First, faces of the driver and the passenger are recognized based on an image captured by the camera 300. Based on a feature of the face of the driver, customer information of the driver may be detected using reference information of a customer information database.

Subsequently, in a captured image, it is determined whether a passenger is riding in the vehicle (S552), and face recognition for the passenger is performed. Age and gender may be determined according to the face recognition.

Whether a passenger riding in the vehicle is present may be recognized by the server 400 (S552).

When the presence of the passenger is recognized, the processor 180 may receive age information about the passenger from the server 400 (S553).

In addition, the processor 180 may receive gender information about the passenger from the server 400 (S554).

The processor 180 may configure a menu suitable for the taste of the passenger based on the age information and the gender information received from the server 400, and output the configured menu suggestion through the digital signage 140 (S555).

Finally, the processor 180 processes an order for a product selected by the customer (S556).

According embodiments of the present disclosure, a time taken to process a product order can be minimized by processing the product order using a past transaction history.

In addition, a differentiated service according to the age and gender of the customer may be provided based on customer recognition.

In addition, a differentiated takeout service may be provided according to the product, the weather, and the feature of the vehicle.

The embodiments of the present disclosure described above may be implemented through computer programs executable through various components on a computer, and such computer programs may be recorded in computer-readable media. For example, the recording media may include magnetic media such as hard disks, floppy disks, and magnetic media such as a magnetic tape, optical media such as CD-ROMs and DVDs, magneto-optical media such as floptical disks, and hardware devices specifically configured to store and execute program commands, such as ROM, RAM, and flash memory.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an" and "the" in this present disclosure, in particular, claims, may be intended to include the plural forms as well. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method of processing a drive-through order, the method comprising:
   receiving, by a transceiver, customer information detected from a database through vision recognition of an image of at least one of a license plate and a face of a customer in a vehicle entering toward a digital signage, wherein the image is photographed by a camera;
   providing, on a display of the digital signage, product information related to a past order history of the customer based on the customer information detected from the database;
   processing, by a processor, a product order of the customer based on recognition of a voice of the customer or a touch input inputted to the digital signage; and
   determining, by the processor, a type of takeout packaging based on whether a type of the vehicle has four wheels or two wheels using recognition of the image.

2. The method according to claim 1, further comprising determining whether the customer is a pre-order customer based on the customer information, wherein when the customer is determined to be a pre-order customer: the providing of the product information based on the customer information comprises providing pre-order information using at least one of audio or video, and the processing of the product order of the customer comprises: providing information for promptly guiding a vehicle to a pickup stand using at least one of audio or video, and providing information that an additional order is available.

3. The method according to claim 1, wherein the product information comprises a most recently ordered product component and a most frequently ordered product component in the past order history of the customer information.

4. The method according to claim 1, wherein the receiving of the customer information comprises receiving information about an age and gender of a passenger detected through face recognition, and the providing of the product information based on the customer information comprises providing recommended menu information differentiated according to the age and gender.

5. The method according to claim 1, wherein the processing of the product order of the customer comprises determining a product component in the past order history or a component modified from the product component as a product order.

6. The method according to claim 1, wherein the processing of the product order of the customer comprises paying a product price according to biometrics-based authentication through a communication system of a vehicle or a mobile terminal.

7. The method according to claim 1, wherein the processing of the product order of the customer comprises:
   issuing payment numbers for divided payments, and performing the divided payments according to payment requests of a plurality of mobile terminals to which the payment numbers are inputted.

8. The method according to claim 7, wherein the processing of the product order of the customer further comprises accumulating mileage in an account corresponding to the mobile terminal undergoing a payment.

9. The method according to claim 1, wherein the determining the type of takeout packaging comprises determining the type of takeout packaging method according to a temperature of a product, an atmospheric temperature, and weather.

10. An apparatus configured to process a drive-through order, the apparatus comprising:
    a transceiver configured to receive customer information detected from a database through vision recognition of an image of at least one of a license plate and a face of a customer in a vehicle entering toward a digital signage, wherein the image is photographed by a camera;
    a digital signage with a display configured to provide product information related to a past order history of the customer on the display based on the customer information; and
    a processor configured to process a product order of the customer based on recognition of a voice of the customer or a touch input inputted to the digital signage, and determine a type of takeout packaging based on whether a type of the vehicle has four wheels or two wheels using recognition of the image.

11. The apparatus according to claim 10, wherein the processor is further configured to: determine whether the customer is a pre-order customer based on the customer information; and when the customer is determined to be a pre-order customer, perform a control operation to provide pre-order information, and control the digital signage to output information for promptly guiding a vehicle to a pickup stand and provide information that an additional order is available.

12. The apparatus according to claim 10, wherein the product information based on the customer information comprises a most recently ordered product component and a most frequently ordered product component in an order history of the customer information.

13. The apparatus according to claim 10, wherein the transceiver is further configured to receive information about an age and gender of a passenger detected through face recognition, and the processor is further configured to control the digital signage to provide recommended menu information differentiated according to the age and gender.

14. The apparatus according to claim 10, wherein the processor is further configured to determine a product component in the past order history or a component modified from the product component as the product order.

15. The apparatus according to claim 10, wherein the processor is further configured to pay a product price according to biometrics-based authentication through a communication system of a vehicle or a mobile terminal.

16. The apparatus according to claim 10, wherein the processor is further configured to:
issue payment numbers for divided payments; and
perform the divided payments according to requests of a plurality of mobile terminals to which the payment numbers are inputted.

17. The apparatus according to claim 16, wherein the processor is further configured to accumulate mileage in an account corresponding to the mobile terminal undergoing a payment.

18. The apparatus according to claim 10, wherein the processor is further configured to control the digital signage to display a type of takeout packaging according to a temperature of a product, an atmospheric temperature, and weather.

* * * * *